May 21, 1946.　　　C. A. LINDBERG　　　2,400,558
SUCTION CLEANER
Filed Oct. 16, 1943

Inventor
Carl A. Lindberg
By
Attorney

Patented May 21, 1946

2,400,558

UNITED STATES PATENT OFFICE 2,400,558

SUCTION CLEANER

Carl A. Lindberg, Toledo, Ohio, assignor to Air-Way Electric Appliance Corporation, Toledo, Ohio, a corporation of Delaware Application October 16, 1943, Serial No. 506,468

2 Claims. (Cl. 183—37)

This invention relates to suction cleaners of the type in which the filtering and suction units are both enclosed within a rigid housing to which a dust-laden air stream is lead through a flexible suction hose from a cleaning tool.

One object of the invention is to provide a suction cleaner of this type wherein the filtering unit is vertically disposed and the hose is connected to the housing in such position as to obtain maximum efficiency in the conveyance of a dust-laden air stream into the filtering and collecting units, yet the center of gravity of the entire body of the cleaner is sufficiently low and the weight is sufficiently distributed horizontally so that the cleaner body may be dragged about by the suction hose without being tipped over by the pull of the hose.

Another object of the invention is to produce a cleaner wherein the suction unit is coupled closely to the filtering and dust collecting unit so as to obtain efficiency in the application of suction to the filtering unit.

A further object is to produce an arrangement wherein the space within a streamlined housing, such, for example, of "tear drop" shape, is utilized so as to obtain maximum compactness.

A still further object is to produce a cleaner of the type indicated wherein both the filtering and suction units can be readily exposed for servicing and wherein a field connection between the suction hose and filtering unit may be readily established. Specifically, in this connection, the invention contemplates an arrangement for particularly rapid exposure of the filtering unit for the removal and replacement of filtering receptacles. For the attainment of the foregoing object, the invention contemplates an arrangement wherein the filtering and suction units are mounted side by side upon a base and enclosed between the base and a dome-shaped cover member which is adapted to be moved to a position wherein the suction and filtering unit are completely or almost completely exposed above the base, and wherein the cover incorporates a separate hinged cover section for the filtering unit which may be quickly raised without moving the main body portion of the cover.

A still further object of the invention is to provide a suction cleaner incorporating improved mechanism for establishing a blower connection to the suction unit and providing for muffling of the sound produced by the normal discharge of air from the suction unit.

Other objects and advantages of the invention will hereinafter appear and for purposes of illustration but not of limitation, an embodiment of the invention is shown in the accompanying drawing in which Figure 1 is a side elevation of a suction cleaner incorporating the invention;

Figure 1:
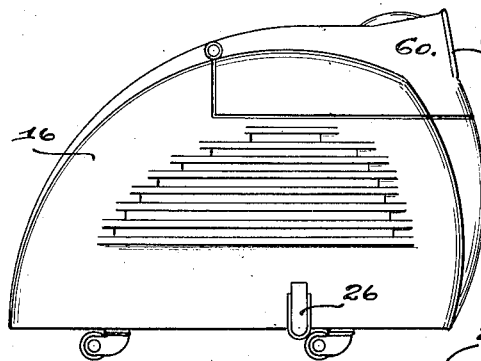

As an example of one form in which the invention may be embodied, we have shown in the drawing the body portion of a suction cleaner embodying a suction unit 10 and filtering unit 12 mounted side by side upon a base 14. A cover 16 cooperates with the base 14 to form a housing defining a chamber 17 in which the suction and filtering units 10 and 12 are enclosed. The cover 16 is provided with foot members 18 which are adapted to rest upon cushioned members 22 on the base 14 for supporting the cover on the base. Latches 26 are adapted to secure the cover 16 to the base. By removing the cover, the filtering unit 12 and suction unit 10 are completely exposed for servicing operations.

The filtering unit 12 includes the receptacle 20, a perforated liner 36 encircling and supporting the lateral wall of the receptacle 20, and a tubular casing 38 encircling and spaced from the liner 36. At the upper end of the casing 38 is an annular channel 40 in which is mounted a ring 42 of compressible material such as, for example, soft rubber, and the receptacle 20, which is preferably of porous paper so that it may be disposed of when filled, is provided at its upper end with a non-porous flange 44 resting upon the packing ring 42.

Figure 2:
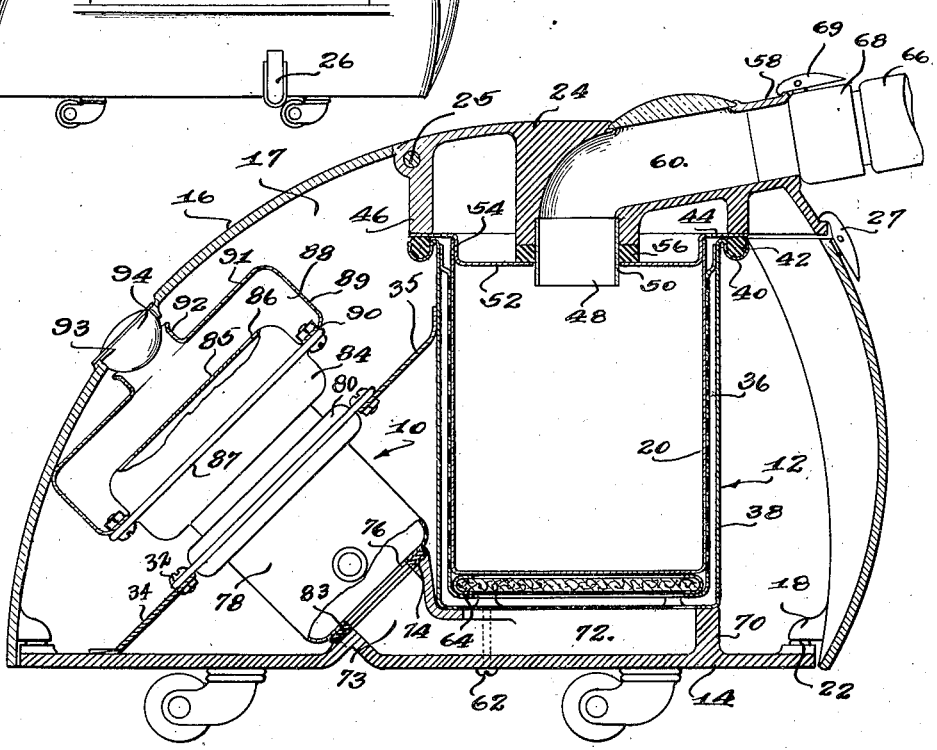
Figure 2 is an enlarged longitudinal sectional view through the same.
Figure 3:
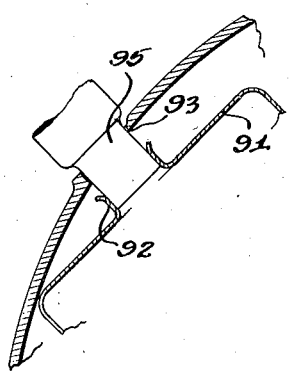
Figure 3 is a detailed sectional view illustrating the means for establishing the blower connection.

The cover 16 is provided with a separate cover section 24 hinged at 25 to the body portion of the cover 16 and having an annular flange 46 adapted to clamp the flange 44 against the packing ring 42. The cover section 24 also has a delivery nozzle 48 receivable in a central opening 50 in a non-porous top member 52, for example of impervious fiber material, which is secured to the receptacle 20. The top member 52 may be connected integrally with the flange 44 by a depressed portion 54 by means of which the top member is stitched to the receptacle 20. The nozzle 48 carries a sealing ring 56 of compressible material, such as soft rubber, which is adapted to seal the nozzle to the top 52. The parts are so arranged that the sealing of the nozzle 48 to the top 52 and the clamping of the flange 44 against the packing ring 42 is effected by latching the cover section 24 in the closed position shown in Figure 2, by means of a latch member 27 pivoted on the main body portion of the cover 16. By unlatching the cover section 24 and raising it to an upstanding position, the filtering unit 12 is exposed so that a filled receptacle 20 may be removed and replaced by a fresh receptacle.

Formed in the cover section 24 is an inlet 58 which is connected to the nozzle 48 by a short duct 60. A cleaning tool (not shown) is adapted to be connected to the inlet 58 by a flexible suction tube 66 having on one end a suitable connector 68 for connection to the inlet 58. The connector 68, may, if desired, incorporate a swivel to permit swiveling of the tube 66 relative to the body of the cleaner. Suitable means, such as a latch 69, may be employed for connecting the hose 66 to the inlet 58 in such a manner as to form a draft connection by means of which the cleaner body may be pulled around at the end of the hose 66.

The casing 38 of the filtering unit 12 is mounted at its lower end on an annular flange 70 formed integrally with the base 14 and constituting one end of a duct 72 adapted to apply suction to the lower end of the casing 38, which is open and in communication with an annular part defined by the flange 70. Suitable attaching elements such as screws 62, extending upwardly through the base 14 and flange 70 and threaded into an inturned flange 64 on the lower end of the casing 38, may be employed for securing the casing 38 to the flange 70. The other end of the duct 72 is extended diagonally upwardly as at 73 and is provided with a counter bore 74 forming a seat for a gasket 83 of yieldable material, such as soft rubber.

The suction unit 10 includes an electric motor having a casing 78, one end of which is seated against the gasket 83 and formed with an inlet port 76 communicating with the upwardly inclined duct portion 73. On the other end of the motor casing 78 is mounted the fan housing 84. The intermediate portion of the motor housing 78 is mounted in an annular vibration absorbing mounting 80 which is attached to the brackets 34 and 35 by the screws 32. Vibration developed in the suction unit is absorbed in the mounting 80, the yieldable gasket 83 permitting the lower end of the motor to vibrate without destroying the sealed connection between the inlet port 76 and the duct portion 73. The vibration is about the center of the mounting 80.

The suction unit 10 is arranged on an axis which is inclined upwardly and rearwardly from the duct portion 73. An important advantage of this arrangement lies in the fact that it provides for maximum closeness of coupling between the inlet 76 and the lower end of the filtering unit 12, thus increasing the suction efficiency of the cleaner. A further advantage of the arrangement arises from the disposition of the fan housing 84 at such an angle as to make available for it a space of maximum extent in the plane of its radii, and also accommodating the shorting mechanism which will now be described.

The upper end wall 85 of the fan casing 84 is provided with an annularly arranged series of discharge openings 86. The housing 84 is preferably formed of a pair of stampings secured together by annular flange means 87. The discharge openings 86 discharge into a discharge chamber 88 which is formed by a shroud member 89 having an inturned flange 90 attached to the flange means 87. Shroud 89 has an end wall 91. Formed in the end wall 91 is a discharge outlet 92 which registers with a discharge outlet 93 in the main cover section 16. The discharge outlet 93 is adapted to be closed by a cap 94 having a curved air deflecting surface cooperating with the outlet 92 to spread the discharge from the chamber 88 in a manner which reduces the noise of discharge to a minimum.

The outlet 92 also serves to deliver the discharge to a blower coupling 95 which may be inserted through the outlet 93. The coupling 95 is adapted to fit snugly in the outlet 92 so as to receive the full discharge from the chamber 88.

The shroud 89 muffles the sound of the air issuing through the discharge aperture 86 in addition to collecting the discharge for delivery to the coupling 95.

It is to be understood that numerous changes in details of construction, arrangement and operation may be effected without departing from the spirit of the invention as defined in the appended claims.

What I claim is:

1. In a suction cleaner, a base, a suction unit and a filtering unit mounted side by side upon said base in vertically disposed arrangement with the outlet of the filtering unit at the lower end thereof in proximity to the base and in juxtaposed relation to the inlet of the suction unit, the inlet of the suction unit being at the lower end thereof, means in the region of the base providing a relatively short conduit between the filtering unit outlet and the suction unit inlet, a cover cooperating with said base to enclose both units, a mounting for said cover enabling same to be moved away from both units to expose same for servicing operations, a separate movable cover section carried by said cover adapted to fit snugly the upper portion of said filtering unit thereby to enable ready inspection of the filtering unit without substantially exposing the suction unit, and means forming a part of said cover section to provide a conduit for dust-laden air to said filtering unit.

2. In a suction cleaner, a housing, a suction unit therein including a fan casing provided with a discharge opening, a shroud attached to said fan casing and forming a chamber into which said opening discharges, said shroud and housing having registering longitudinally spaced blower outlets of approximately the same diameter through which a blower attachment coupling may be inserted for connection with said shroud to receive the concentrated discharge from said chamber, and a cap normally closing the blower outlet of said housing and having a dome-shaped inwardly extending air deflecting surface disposed in the path of the air stream from the blower outlet of said shroud and projecting into same for spreading the discharge therefrom and reducing the noise of said discharge to a minimum.

CARL A. LINDBERG.